(12) United States Patent
Anderson et al.

(10) Patent No.: US 7,123,144 B2
(45) Date of Patent: Oct. 17, 2006

(54) MONITORED TRANSMITTER AND RECEIVER SYSTEM AND METHOD FOR SAFETY DEVICES

(75) Inventors: Michael Anderson, Ronks, PA (US); Timothy Castello, West Chester, PA (US); Gary Leigh, Kennett Square, PA (US); Bearge Miller, Glen Mills, PA (US)

(73) Assignee: Miller Edge, Inc., West Grove, PA (US)

( * ) Notice: Subject to any disclaimer, the term of this patent is extended or adjusted under 35 U.S.C. 154(b) by 8 days.

(21) Appl. No.: 10/830,620

(22) Filed: Apr. 23, 2004

(65) Prior Publication Data

US 2005/0017663 A1    Jan. 27, 2005

Related U.S. Application Data

(60) Provisional application No. 60/464,810, filed on Apr. 23, 2003.

(51) Int. Cl.
*G08B 13/08* (2006.01)
(52) U.S. Cl. .............. 340/545.1; 340/545.2; 340/545.3; 340/555; 49/25; 49/28; 318/280
(58) Field of Classification Search ............ 340/545.1, 340/545.2, 545.3, 545.6, 521, 522, 551–561, 340/565, 635; 49/25–28, 199, 360; 318/280, 318/282, 266, 286, 466; 324/207.17
See application file for complete search history.

(56) References Cited

U.S. PATENT DOCUMENTS

| 5,191,268 | A | 3/1993 | Duhame |
| 5,285,136 | A | 2/1994 | Duhame |
| 5,384,495 | A | 1/1995 | Waggamon et al. |
| 5,412,297 | A | 5/1995 | Clark et al. |
| 6,225,768 | B1 | 5/2001 | Cookson et al. |
| 6,737,821 | B1 * | 5/2004 | Fitzgibbon et al. ......... 318/280 |
| 6,737,823 | B1 * | 5/2004 | Reed et al. ................. 318/466 |
| 6,791,461 | B1 * | 9/2004 | Oku et al. ............... 340/573.1 |

* cited by examiner

*Primary Examiner*—Davetta W. Goins
(74) *Attorney, Agent, or Firm*—Robert B. Famiglio; Famiglio & Associates

(57) ABSTRACT

An automatic door opening system utilizing wireless links to communicate from hazard or obstruction sensors to a controller to react to such conditions. The present invention allows the use of hazard, fault or obstruction switching devices which themselves utilize internal continuity monitoring in a wireless environment. Compressible hazard switch sensors which utilize internal, continuous conducting elements are continually monitored for breaks in such elements through continuity checks. A signal is generated from the wireless transmitter during door operation to indicate to the system that the link between the wireless transmitter and a wireless receiver is fully functioning at all times. The system can determine if an actual obstruction hazard is detected or if there is a loss of communications between the wireless transmitter and receiver link in the disclosed system while also allowing for wireless continuity checking between sensor switches utilized.

7 Claims, 4 Drawing Sheets

MONITORED TRANSMITTER AND RECEIVER SYSTEM AND METHOD FOR SAFETY DEVICES

CROSS REFERENCE TO RELATED APPLICATIONS

The Applicants claim the benefit of their provisional application No. 60/464,810 filed on Apr. 23, 2003.

BACKGROUND OF THE INVENTION

The present invention relates generally to door systems, and more particularly to automatic door safety systems which use wireless links for sending information regarding the detection of a hazard condition or the operational status of the entire wireless system and hazard detection components of a system.

Automatic door operating systems are popular in commercial or residential settings. Such doors typically include the operation of overhead door systems, elevator doors or other automatic control systems to open and close doors in various categories. Such doors also typically provide for obstruction detection to prevent the door from continuing to close when the apparatus on the door senses an obstruction in the door's path. Such obstruction sensors and obstructions switches usually include means to activate internal contacting devices within such sensors when the switch is compressed when it strikes an obstruction during the operation of a door. Such switches may include normally open, compressible door edge cells which contain internal electrical conductors which contact each other upon compression of the cell.

Present systems utilize such door edge systems usually along the leading edge of the door in a location where the system is likely to become compressed when striking an object, compressing the internal conductors together causing an electrical path to be completed thereby providing a fault signal typically communicated by a control wire to the motor controller to stop operation of the door immediately.

In many environments it is desirable to monitor the safety switches and safety sensors typically utilized with power operated doors in a wireless environment, rather than require a 2-conductor or 4-conductor wire lead to track the operation of the door as it opens and closes. It is desirable to eliminate the wear and tear on such conductor as it tracks the door through many thousands of operations. In today's environment, motor operated doors typically are expected to last ten years or more thereby placing considerable physical wear and tear on the conductors which may track the motion of the door to facilitate the connection between safety edge sensors and the controller monitoring for obstructions indicated by such sensors. Eliminating such hard-wired connections is important, but maintaining failsafe reliability systemwide is paramount. Also important is an ability to continuously monitor a system regardless of whether the door being protected is actually in operation. The systems disclosed in the prior art lack such an important combination of features.

SUMMARY OF THE INVENTION

The present invention provides an automatic door control system which utilizes wireless links between the safety edge switches which detects hazard conditions to eliminate the need for control cable conductors to communicate between door edge sensors and the control unit monitoring the sensors. Desirable safety edge sensors typically also check for internal continuity on each side of the electrical switch which comprises elongated conductor foils within a safety edge switch to assure continuity on each side of the such switch. When a hazard condition is detected, a wireless signal is sent from the vicinity of the door edge safety sensor to the controller to stop operation of the door.

Further, the present invention disclosed allows for a fault signal to be generated should there be an internal failure of the door edge safety sensor such as to require communication of that fact, wirelessly, to the same controller. At the same time the system also provides for continuous fault monitoring of the wireless link between the sensor transmitter and the receiver utilized to communicate the transmitter signal to such controller. By providing a periodic signal from the transmitter to the receiver, the receiver recognizes that the communications path between the transmitter and receiver is operating. Such periodic monitoring can prevent failure of the entire system should the radio frequency link be disturbed because of equipment failure or such other environmental conditions such as electromagnetic interference created by other apparatus or equipment within the operating environment. Such a periodic signal provides a continuous status check. Depending on the battery life desired in the transmitter, such periodic status check signals should repeat on a short time basis to be assured that failure of the link during operation of the door will be noticed by the system quickly and a fault signal provided to stop operation of the door or take other action.

The system also provides a means to determine whether the door being protected is in motion, thereby signaling the transmitter to stay in continuous operation during the door movement to provide the ability for faster signaling to the receiver if a fault condition is detected. The door motion is detected using a secondary sensor such as a mercury switch or other vibration sensing switch to indicate to the transmitter that the door is moving and the transmitter should remain in an on condition through the entire operation.

After a predetermined period of time has passed since motion of the protected door has ceased, the transmitter is commanded back to a "sleep" mode to conserve battery power while continuing to periodically check the parameters of other safety features in the system such as the integrity of a door edge switch, battery voltage condition or other system tamper indicators. Further, the transmitter polls the receiver in the system on a periodic basis, in an exemplary embodiment five minute intervals, to assure that the transmitter and receiver are in communications and that all systems are nominal prior to the next cycling of the door being protected by the system.

The disclosed system consists of one or more transmitters and a receiver which communicate in the UHF radio range. Each transmitter is connected to a safety device, typically a two- or four-wire safety edge switch such as the Miller Edge™ switch, disclosed for example in U.S. Pat. Nos. 5,728,984, 4,785,143 and 4,396,814. The safety device is typically installed on the leading edge of a sliding door or garage overhead door. If a transmitter senses that it has hit an object, it communicates this to the receiver. The latter then actuates the associated relay as a control signal to the motion controller. Typically, a door/gate reversal is executed at this point. Speed of response and noise immunity are the most desired design features for transmitters and receivers employed in this type of system.

The transmitter and receiver used in the present invention has a unique radio frequency channel designator set by DIP switches. In addition each transmitter and receiver has an ability to uniquely address each other in the system so that multiple systems may coexist in one location.

In the example embodiment, each transmitter has a primary and a secondary switch input. Such connections may be for edge switches which are of the Normally-Open (NO) or Normally-closed (NC) types. It is anticipated that some users will have, for example, a secondary door "break-out" signal which must be responded to in a different manner as that of the primary signal from an edge obstruction switch device. A DIP switch controls the desired NO verses NC state.

Either two- or four-wire safety devices may be connected to the system. In the former case, shorting jumpers may be installed on the transmitter board to account for this type of edge switch device. In the latter case, four-wire, a fault to any of the input lines will cause the transmitter to issue a fault indication.

The transmitters in the system are battery powered and typically each will have a 9V Lithium battery. The transmitters are designed to be highly efficient and they spend a majority of time in a dormant or inactive state. The unit automatically wakens itself on a rapid cycle. One of the fundamental trade-offs in a system employed as with the present invention is speed of response and noise immunity vs. battery longevity. While it is desired to keep the transmitter size as small as possible, it is possible to accommodate larger capacity batteries of various types if necessary for a particular application if longer life is of importance for a given application.

The transmitter checks its inputs every 18 milliseconds. It radiates a status signal every five minutes in a typical installation, even if the status is "Everything Okay." The receiver expects to hear from each transmitter within a preprogramed amount of time, typically 2 to 5 minutes. If the receiver does not receive a signal from the transmitter, this itself is defined as a fault. The receiver can be programmed to wait a longer time to hear from the transmitter if desired to account for momentary signal loss or other temporary problem. In the event the expected signal is not received, the appropriate channel relay will then be actuated. When the transmitter detects a fault it generates a train of 24 signals to assure reception and response. This feature can be used in facilities with high EMI backgrounds.

Both transmitter and receiver are controlled by Microchip PIC parts though those skilled in the art may recognize that there could be a large amount of flexibility in modifying the design to obtain the same function using a variety of different integrated circuit designs.

The communication protocol between transmitter and receiver is simple and is designed to be as minimal as possible to speed the reaction time of the system. It is possible to support different responses for different contingencies. The communication protocol lets the receiver know exactly what the fault is, even if the end result is the same, such as a relay closure at the receiver. For example, a Maintenance-Required LED may be included which will be activated (along with the appropriate relay) to indicate a low battery situation, a tamper attempt, a secondary input sensor trip, or other fault indication.

The present transmitter design supports two different possible radio frequency design schemes. One method is based on a Micrel MICRF102 device with a quartz crystal frequency base. This method consumes more power and necessitates a careful software controlled start-up sequence. The transmitter has an LED and a connection for a buzzer as sensory outputs of operation.

The transmitter employs a low-inductance PCB-loop antenna. The receiver employs a Quarter Wavelength monopole antenna on a coaxial connector. Both transmitter and receiver are enclosed in boxes comprised of lightweight, high impact materials which are easily installed in the field.

The receiver is powered by 24 VAC, which is industry standard. In the preferred embodiment of the invention, the receiver supports up to three different channels, each with a 1A relay and a red fault LED. The same receiver may be configured to operate with only one or two relays. Each relay may be jumper-selected as NO or NC output. Additions to the receiver can support a green "Signal Received" LED as well as a yellow "Battery-Low" LED.

DETAILED DESCRIPTION OF THE INVENTION

The following is a detailed description of the preferred embodiment of the Radio Frequency ("RF") link system for an automatic door safety edge. The description is not intended to limit the scope, applicability or configuration of the invention in any way. However, the following description does provide a convenient illustration for implementing a preferred embodiment of the invention. Upon review of the following description it will occur to those skilled in the art that various changes may be made to the function and arrangement of the elements described in the preferred embodiment without departing from the spirit or scope of the invention as set forth herein and in the appended claims.

Figure 1:
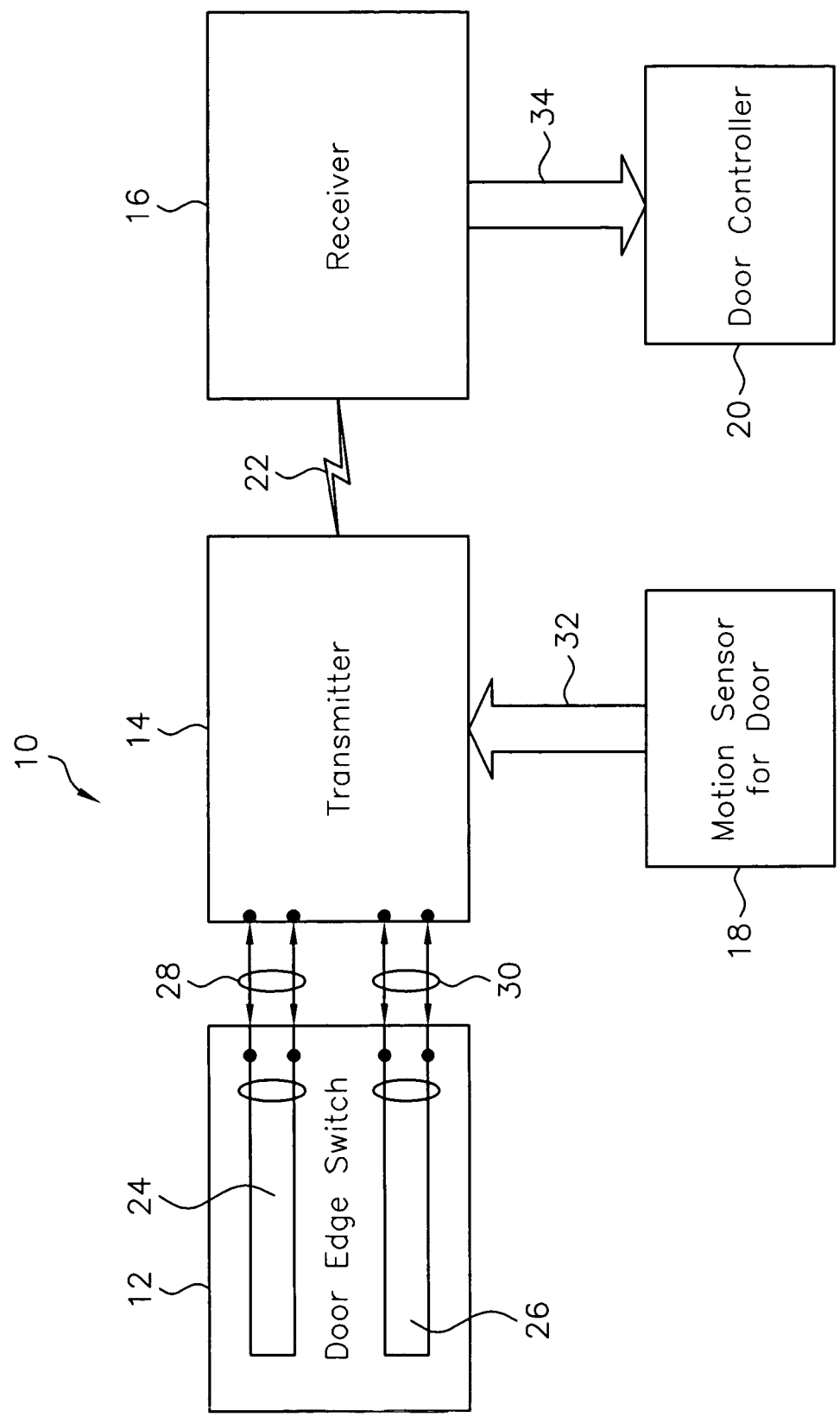
FIG. 1 is a block diagram of a typical installation of the various components used in the invention.

Referring now to FIG. 1, a block diagram of the entire system 10 is presented. Door edge switch 12 is a membrane type switch which utilizes a door edge safety sensor in the present invention, mounted on the lower edge of an overhead garage door or some other rolling door or movable door, which may be used in a variety of applications whether commercial or residential. In a typical installation, a movable door, whether overhead or in an elevator for closing laterally, the door moves between the open and closed positions in response to a command from a door controller mechanism which itself drives the motors or chain drives to actuate the door. It is always desirable that obstructions be automatically and instantly recognized to halt operation of the door as a safety feature. Door edge switch 12 is most frequently configured to be placed along the leading edge of a movable door, such as an overhead door, to acuate the switch upon compression of switch 12.

In conventional systems the door switch is hardwired through physical contact with a controller which, sensing actuation of the switch, signals the controller to stop motion or, as may be desired, to reverse motion and open the door. The prior art describes a variety of different systems utilized to present obstruction signaling for overhead doors or other types of doors and elevator systems, and the like, whether pneumatically or electrically controlled. It is desirable in many situations to eliminate the hardwired cabling between the door edge switch or similar control switching apparatus to the door controller such that both the wear and tear and the inconvenience of having a cable tracking the motion of an operating door can be eliminated. Over time such cables will fail from continued motion day to day and therefore either reduce the protection provided by the system or place the door out of service until the cable can be repaired or replaced.

In the present invention, system 10, the information conveyed by switch 12 regarding obstruction detection is conveyed to a wireless transmitter 14 which itself is communicating with a receiver 16 through a radio frequency link 22. Such transmitters and receivers have been employed in the past for a variety of different applications including, but not limited to remote control systems for car alarms, burglary systems and control of overhead doors.

In applying wireless or radio frequency techniques to present link 22 in system 10, a problem arises regarding the assurance of reliability of the system. If transmitter 14 is signaling an obstruction condition signaled by door edge switch 12, it would be appreciated that receiver 16, normally placed in the vicinity of the door controller 20, must receive information from transmitter 14 in order to command the door controller to take what action is desirable. Receiver 16 communicates to door controller 20 through path 34 normally a wired path with a connection directly from the receiver 16 to the door controller 20. While this operation may be straightforward, in the event that transmitter 14 or receiver 16 is not functioning or, should RF link path 22 be obstructed for any reason whether temporary or permanently, it is necessary to account for such occurrences to provide the failsafe operation of system 10. In that regard, one way to do so is to have transmitter 14 continually connected to receiver 16 through link 22. In such fashion, receiver 16 could be programmed to take action if transmitter 14 failed or RF link 22 became ineffective. Such an "always on" condition has obvious power consequences because transmitter 14 is necessarily battery operated to take advantage of the wireless condition of mounting transmitter 14 on a particular door or other protected portal which contains switch 12. While some systems in the prior art are designed to have a transmitter poll a receiver on a regular basis, perhaps every few seconds, the obvious consequence of battery life makes such a design undesirable. Other systems only poll the receiver while a door is actually operating and does not check the "health" of the entire system while in a standby mode.

In the present invention, system 10 provides a means to enable transmitter 14 to send information continuously upon actual operation of the rolling door or other moving door such that there is a continuous monitoring of the status of switch 12. While in this active mode, obstructions encountered by switch 12 will be immediately conveyed from transmitter 14 to receiver 16. To do this, transmitter 14 must be commanded to remain in an active condition only when the door is in operation. By using motion sensor 18, transmitter 14 can be commanded to remain in the on mode, continually monitoring the condition of switch 12, while the door being protected is in motion. To do so, it is necessary for transmitter 14 to be activated when the door is moving so that the continuous operation mode can be implemented.

Motion sensor 18 can be a variety of different mechanisms, but in the preferred embodiment the most effective means is to use a mercury switch or other switching means which are very susceptible to any vibration. A mercury switch or reed switch is in a position on the door to be protected. Placement of sensor 18 should be placed in a position on the door which is subject to the most vibration or movement during the operation of the door. Sensor 18 can continually signal transmitter 14, through path 32, that the transmitter should remain in an active condition transmitting its status at all times to receiver 16 through link 22. Upon completion of the motion of the door, motion sensor 18 will cease being active and will discontinue signaling transmitter 14 through path 32. After a preselected "time out," normally one or two minutes, transmitter 14 can return to a standby mode by conserving transmitter battery power.

Transmitter 14 is designed to have several different features to enhance the safety of the system. First, transmitter 14 includes a tamper switch system which will signal receiver 16 when transmitter 14 is either removed, opened, or otherwise tampered with. Other such incorporated monitoring capabilities include measurement of battery voltage as well as provisions for additional secondary sensors other than motion sensor 18. Such additional or secondary inputs could be for Infrared beam sensors, ultrasonic or RF motion sensors or other specific sensors designed for special applications. Such sensors can be integrated into the control protocol for operating the door or to stop the door upon the currents of other designed events. Further, transmitter 14 is designed to generate a signal over RF link 22 which is addressable such that the transmitter can coexist on a given channel at a given facility with other systems 10 operating nearby on other doors. In such a fashion, it can be appreciated by those skilled in the art that transmitter 14 may be selectable on a number of different operating channels such that multiple systems 10 can operate within a given facility with minimal interference between the system.

Transmitter 14 can operate on one of several channels that can be selected during installation. Further, transmitter 14 can encode defined addresses on a given channel to enable receiver 16 (which is configured to respond to a given transmitter 14 specifically configured to address a given receiver 16), to operate on a common frequency used by other systems within the facility. Using frequency agile transmitters, along with the system of addressable receivers for a given frequency, it can be appreciated that multiple systems 10 can operate within radio range of each other with negligible interference and without a given transmitter 14 signaling an unintended receiver 16 from a different system, even if operating on the same frequency. In the preferred embodiment as disclosed, the transmitter and receiver frequency as well as the address encoding is performed by conventional DIP switches or other methods to configure a given system 10.

Continuing to consider FIG. 1, one advantage of the present invention is the use of door edge switches 12 which utilize a failsafe system within the switch itself. FIG. 1 is comprised of two conductors within a compressible structure which is designed to make electrical contact upon compression of the switch material to signal contact with an obstruction. First door switch element 24 would contact second door switch element 26 as shown in FIG. 1 upon compression of the switch, thereby enabling a closed circuit, assuming that the configuration being used is a normally open switch configuration. It should be noted that the present invention can operate with a normally closed switch, a normally open switch or some other configuration because of the flexibility of the system as described below. In the preferred embodiment, a normally open switch 12 is used as suggested in FIG. 1.

Utilizing a closed loop system on both switch element 24 and switch element 26, it can be seen that continuity of the conductor can be measured at all times to be certain that the switch is in operating condition. From time to time it is possible that door edge switch 12 may be damaged or worn out by continual use and failure may not be detected during a normal inspection. In the event that one of the conductors within the door edge switch fails, it can be seen from FIG. 1 that continuity as measured across first switch conductor cable 28 or second switch edge conductor cable 30 would be broken. Transmitter 14 is designed to allow continuous monitoring of the continuity of switch element 24 and switch element 26, thereby immediately being able to signal a fault condition if continuity of one side or the other side of the switch conductor is broken. Such an indication would not be possible in utilizing remote sensing or signaling systems which are configured only to work on more conventional door edge switches comprised of a single conductor on each side of the switching element.

Figure 2:
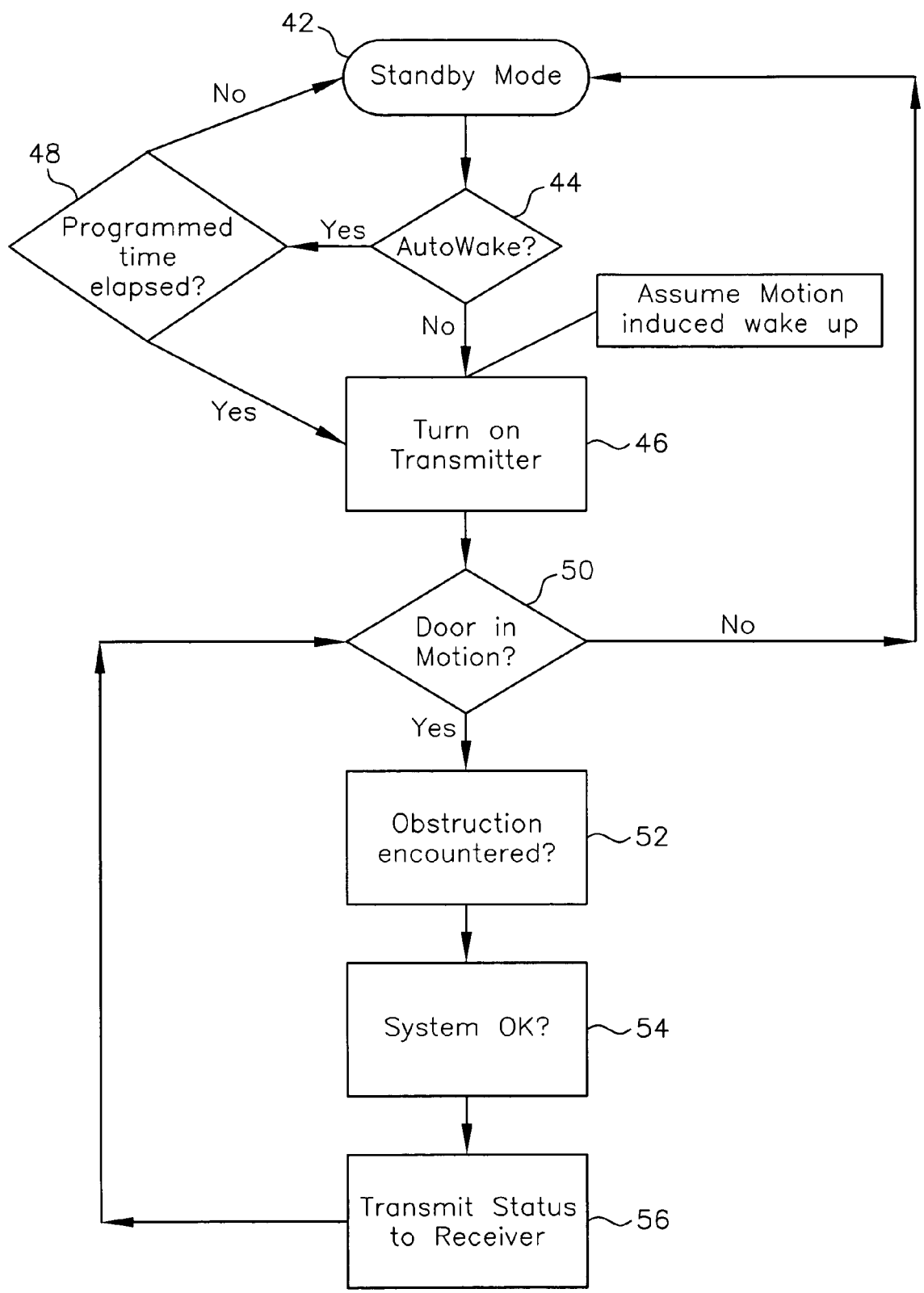
FIG. 2 is a block diagram illustrating an exemplary sequence of the operating steps of an exemplary embodiment of an automatic door safety system of the present invention.

Turning to FIG. 2, a block diagram illustrating an exemplary sequence of the operating steps of one embodiment of the system is presented. Transmitter 14 begins in a standby mode 42. If transmitter 14 becomes active, a decision is made whether it is because of an automatic awakening 44 or because a motion sensor for the door 18 has commanded the transmitter to an active state. If it is determined the transmitter has become active 44, the system determines whether the preprogrammed elapse time 48 has occurred. Elapsed time 48 is programmed to be between two and five minutes depending on how frequently the user of system 10 would desire transmitter 14 to poll receiver 16, testing both the link 22 and the general condition of the entire system. If the program elapse time 48 has occurred, transmitter 14 gets turned on as shown at 46 in FIG. 2, and a short transmitter activation time results. If in fact the transmitter becomes active because of motion sensor 18, evaluation of the program elapse time 48 is not necessary and the system proceeds to turn on the transmitter directly at 46. As long as the door remains in motion at 50 the transmitter 14 remains active, checking to see if the door has hit something or encountered an obstruction 52 as well as continuing to check the system operation 54 during the period of time that the transmitter is in an active state. During this active state the transmitter conveys its status to the receiver at 56 and continues to operate through the loop as shown in FIG. 2 until the door motion is terminated. At step 50 when the door motion has terminated and the preselected time-out delay has expired, the system returns to a standby mode 42 as shown in FIG. 2.

During the operation of the system, transmitter 14 can become active to transmit a fault condition such as low batter voltage, failure of the monitored edge sensing switches, tampering or other desired features. Transmitter 14 can be configured also to automatically awake into the active mode to convey such error or fault conditions to receiver 16 if desired to disable door controller 20 if desired. In a separate configuration, such fault conditions can present indicator outputs rather than a disabling condition. For example, both transmitter 14 and receiver 16 can provide fault indication LED light indicators showing a variety of conditions. A low battery condition on the transmitter 14, tampering with the case of transmitter 14, failure of door edge switch 12 continuity check, or failure of receiver 16 to be polled by transmitter 14 within a preprogrammed time period can provide fault indicator lights while at the same time disabling the operation of the door by signaling controller 20 and disabling operation until the system is inspected.

In a preferred embodiment, receiver 16 is designed to automatically signal controller 20 through path 34 if receiver 16 does not receive a signal from transmitter 14 while transmitter 14 is in the standby or inactive mode in between operation of the door. As an example, typical operation of the invention requires that receiver 16 be polled by transmitter 14 every five minutes when transmitter 14 is in the inactive or standby condition. Receiver 16, failing to hear from transmitter 14 during preprogrammed time period would command the door controller to off or fault status shutting down system 10 until the system can be checked to determine the reason for the fault. In practice, it has been determined that receiver 16 can wait a multiple period of timed intervals to hear from transmitter 14 before determining that there has been a genuine fault in the system. It can be appreciated that the parameters to be used in a given system 10 would be dependent on the tolerance for a possible fault which the operator of the system determines is appropriate.

Figure 3:
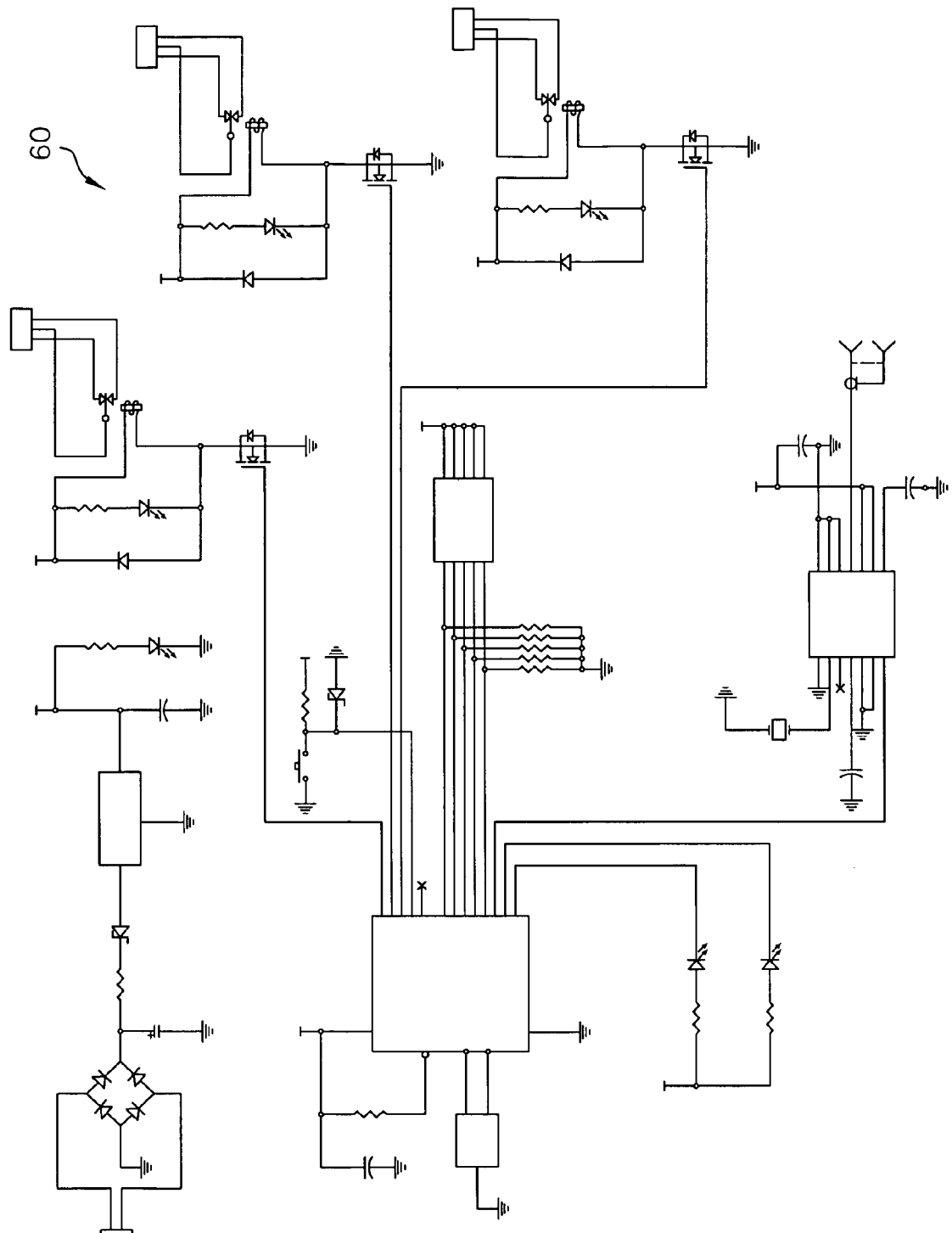
FIG. 3 is a schematic diagram of an example of a multichannel wireless receiver utilized to practice the present invention.

Turning now to FIG. 3, a schematic diagram of a typical multichannel receiver for use in the present invention is disclosed. Receiver 60 is of conventional design and is used in the operation of system 10 in an exemplary embodiment. The illustrative design shown at 60 for receiver 16 is configured to operate with transmitter 14 in system 10.

Figure 4:
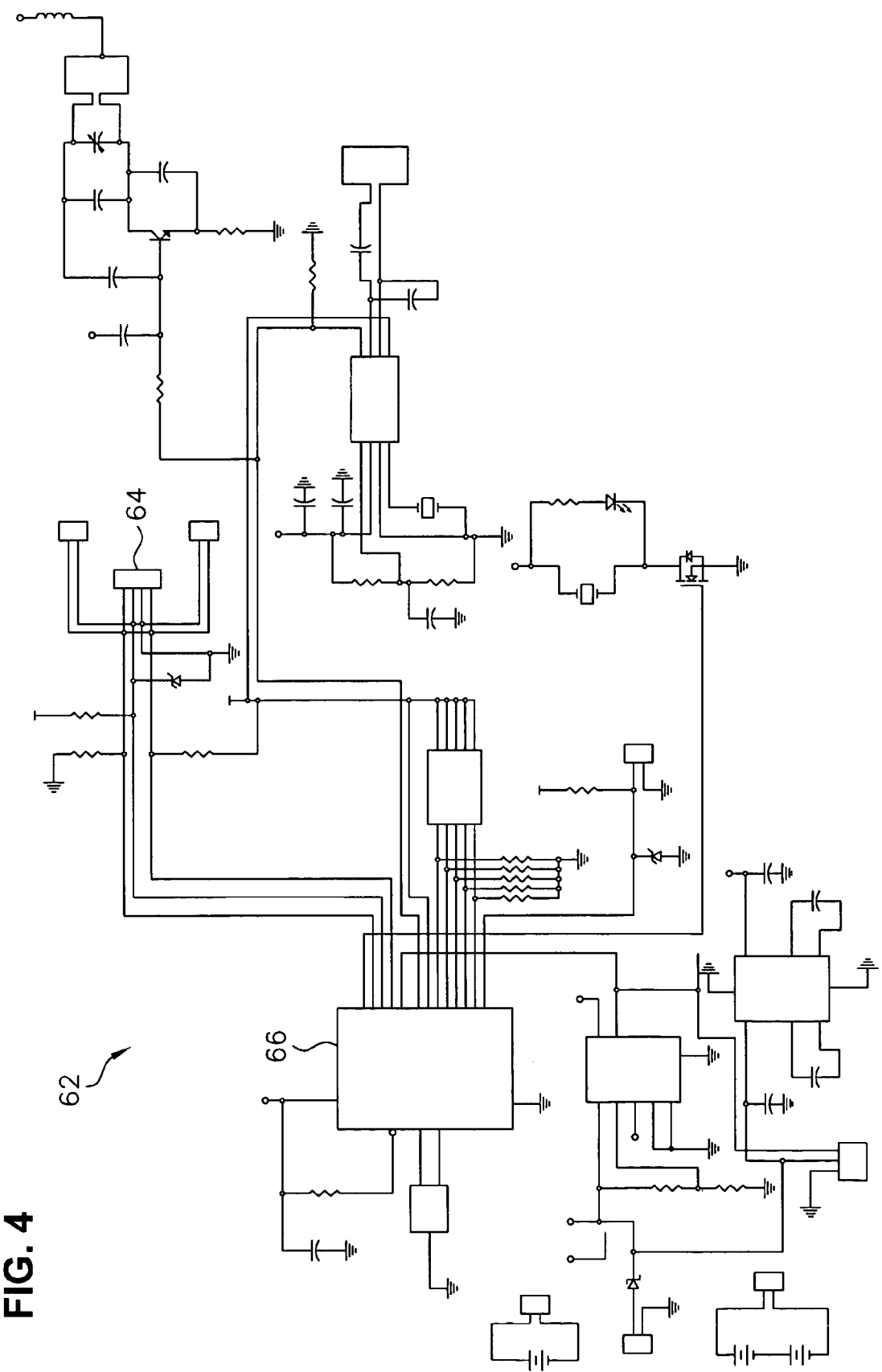
FIG. 4 is a schematic diagram of a wireless transmitter utilized to practice the present invention.

FIG. 4 shows the typical transmitter design which can be used effectively with receiver 60. Particular note should be given to the design of the transmitter board 62 which incorporates a 4-conductor connection at 64 which allows connection of a 4-terminal door edge switch as shown at 12 in FIG. 1. FIG. 1 discloses first switch conductor cable 28 and the second switch conductor cable 30 as it is configured with transmitter 14. Such connections used on board 62 are shown at 64, which allows for continuity checking across the entire length of a given door edge switch 12, as discussed above. Connector 64 is integrated into the design of integrated circuit 66 which presents terminals which can be effectively used to provide sensing of the continuity switch element 24 and switch element 26 to provide a fault indication in the event that there is a loss of continuity between each side of the switch element as described in more detail above.

With the above, an automatic door system according to the various aspects of the present invention has been disclosed with reference to a particular preferred embodiment. It will be obvious to those skilled in the art that the system disclosed may be comprised of diagnostic systems that may be altered slightly to provide for specific requirements of a given installation. While the principles of the invention have been described in an illustrative embodiment, it should be apparent that many modifications of structure, arrangement, proportions, specific elements, as well as materials and components can be used in the practice of the invention. Improvements or adjustments not specifically described may be varied and in particular adapted for specific applications that warrant different operating requirements without departing from those principles as set forth above.

The invention claimed is:

1. An automatic door system for operating a motor driven door, comprising:
   a motor operatively connected to a door;
   a controller for operating said motor;
   a activation switch, wherein said switch operates the said motor to control the door;

a sensor switch for detecting a hazard condition, wherein said sensor generates a hazard signal when said sensor detects a hazard, wherein said hazard signal is one of a first mode and a second mode, and wherein said hazard signal is transmitted to said controller when the switch is activated;

said sensor switch comprised of at least two conductors which contact each other upon physical pressure resulting from a hazard condition, whereby each conductor includes a means to connect the conductor at each end of the conductor such as to allow the passing of an electrical current through the conductor to test the continuity of each conductor;

said controller testing for continuity of each of the said at least two conductors to determine a fault in any one of said conductors;

said controller performs a diagnostic check to determine whether at least one of said sensor, a connection between said sensor and the switch, the switch, a connection between the switch and said controller, and said controller are functioning properly and if so, said sensor generates a signal, and wherein if any of said sensor, said connection between said sensor and the switch, the switch, the connection between the switch and said controller, and said controller are not functioning properly, the said signal is not generated and said controller switches to a fault mode.

2. A method for enhancing safety in an automatic door system utilizing a wireless control link system for operating a door and a motor, comprising the steps of:

providing a controller for operating said motor;

sensing whether a hazard condition is present at a more frequent interval when the door being controlled is in motion, and a less freauent interval when the door being controlled is not in motion;

generating a hazard signal according to whether a hazard condition is present;

communicating said hazard signal with a wireless system to said controller;

controlling the motor to open or close said door according to said communicated hazard signal; and determining whether at least one of a sensor, a connection between said sensor and a switch, said switch, a connection between said switch and a transmitter, and said transmitter are functioning properly, and wherein if any of said sensor, said connection between said sensor and said switch, said switch, said connection between said switch and said transmitter, and said transmitter are not functioning properly, said controller switches to a fault mode.

3. The automatic door system of claim 1 wherein said hazard signal is transmitted to said controller wirelessly.

4. The automatic door system of claim 1 wherein said first mode hazard signal is active when said door is not in motion and said second mode hazard signal is active when the said door is in motion.

5. The automatic door system of claim 4 wherein said hazard signal is transmitted to said controller wirelessly.

6. An automatic door system for operating a motor driven door, comprising:

a motor operatively connected to a door;

a controller for operating said motor;

a sensor switch for detecting a hazard condition, wherein said sensor generates a hazard signal when said sensor detects a hazard, wherein further said sensor switch includes means to continually test the operation of said sensor switch;

means to switch the said motor to control the door;

means to generate a fault signal to said controller if the said sensor switch fails;

means to continuously monitor the integrity of the system which include less frequent monitoring when said door is not in motion and more frequent monitoring when the said door is in motion.

7. The automatic door system of claim 6 further including means to communicate between said sensor switch and said controller without wire connections.

* * * * *